(12) United States Patent
Yasooka et al.

(10) Patent No.: US 9,634,348 B2
(45) Date of Patent: Apr. 25, 2017

(54) BATTERY PRESSING DEVICE AND BATTERY PRESSING METHOD

(71) Applicants: Nissan Motor Co., Ltd., Yokohama-shi, Kanagawa (JP); Automotive Energy Supply Corporation, Zama-shi, Kanagawa (JP)

(72) Inventors: Takeshi Yasooka, Yamato (JP); Hiroki Fujiwara, Isehara (JP)

(73) Assignees: Nissan Motor Co., Ltd., Yokohama (JP); Automotive Energy Supply Corporation, Zama (JP)

( * ) Notice: Subject to any disclaimer, the term of this patent is extended or adjusted under 35 U.S.C. 154(b) by 304 days.

(21) Appl. No.: 14/370,642

(22) PCT Filed: Feb. 13, 2013

(86) PCT No.: PCT/JP2013/053380
§ 371 (c)(1),
(2) Date: Jul. 3, 2014

(87) PCT Pub. No.: WO2013/122096
PCT Pub. Date: Aug. 22, 2013

(65) Prior Publication Data
US 2014/0352138 A1 Dec. 4, 2014

(30) Foreign Application Priority Data

Feb. 13, 2012 (JP) .................. 2012-028504

(51) Int. Cl.
*H01M 10/04* (2006.01)

(52) U.S. Cl.
CPC ....... *H01M 10/0404* (2013.01); *H01M 10/04* (2013.01); *H01M 10/0481* (2013.01); *Y10T 29/49108* (2015.01); *Y10T 29/53135* (2015.01)

(58) Field of Classification Search
None
See application file for complete search history.

(56) References Cited

U.S. PATENT DOCUMENTS

| 4,627,253 A | 12/1986 | Tennessen et al. |
| 2002/0045094 A1* | 4/2002 | Yoshino ................ H01M 2/30 429/137 |
| 2009/0253038 A1 | 10/2009 | Segawa et al. |

FOREIGN PATENT DOCUMENTS

| CN | 101202365 A | 6/2008 |
| CN | 102082241 A | 6/2011 |
| JP | 2000-285954 A | 10/2000 |

(Continued)

*Primary Examiner* — Jonathan Crepeau
(74) *Attorney, Agent, or Firm* — Global IP Counselors, LLP

(57) ABSTRACT

A battery pressing device for pressing a battery cell, the battery cell including an external casing, an electrolyte, a battery element in which electrodes and a separator are arranged in layers in the external casing, electrode terminals extending out of the external casing from an end of the battery element, and an insulating member for preventing short-circuiting of the electrode terminals attached to the electrode terminals inside the external casing, the battery pressing device includes a pressing member configured to press the battery cell in a layering direction of the battery element over a region so as to avoid pressing the insulating member inside the external casing.

3 Claims, 9 Drawing Sheets

(56) References Cited

FOREIGN PATENT DOCUMENTS

| | | |
|---|---|---|
| JP | 2001-189326 A | 7/2001 |
| JP | 2002-151156 A | 5/2002 |
| JP | 2005-334684 A | 12/2005 |
| JP | 2010-9978 A | 1/2010 |
| JP | 2012-155886 A | 8/2012 |

\* cited by examiner

BATTERY PRESSING DEVICE AND BATTERY PRESSING METHOD

CROSS-REFERENCE TO RELATED APPLICATIONS

This application is a U.S. National stage application of International Application No. PCT/JP2013/053380, filed Feb. 13, 2013, which claims priority to Japanese Patent Application No. Japanese Patent Application 2012-28504 filed in Japan on Feb. 13, 2012, the contents of each of which are hereby incorporated herein by reference.

BACKGROUND

Field of the Invention

The present invention relates to a battery pressing device and a battery pressing method.

Background Information

In recent years, battery cells have been used in various products. With battery cells, a battery element in which a positive electrode, a separator, and a negative electrode are layered is disposed in an external casing. The battery element is immersed in an electrolyte inside the external casing, and power is generated by a chemical reaction.

In the process whereby such battery cells are manufactured, the electrolyte is infused into the external casing, with the battery element disposed inside the external casing. The electrolyte progressively infuses the interior of the battery element starting from the periphery. For this reason, air remains in the interior of the battery element in some cases.

In addition, after infusion of the electrolyte, some of the electrolyte is converted to gas due to the chemical reaction and can accumulate inside the battery element in some cases.

Thus, a known method is to enhance electrolyte infusion by roller-pressing the battery cell in order to press out the gas in the interior of the battery element (refer to Japanese Laid-Open Patent Application No. 2002-151156).

SUMMARY

However, with the invention described in Japanese Laid-Open Patent Application No. 2002-151156, the entire surface of the battery cell is pressed by rollers. There is thus the potential for scratching the surface of the battery cell by the rollers if the press carries out pressing over unnecessary sections.

The present invention was developed in light of this state of affairs, and it is an object of the invention to provide a battery pressing device and a battery pressing method whereby pressing is carried out without pressing the ends of the battery cell.

The battery pressing device of the present invention presses a battery cell configured so that an electrolyte and a battery element in which electrodes and a separator are arranged in layers are included in an external casing. The battery cell has electrode terminals extending out of the external casing from an end of the battery element, and also has an insulating member that prevents short-circuiting of the electrode terminals and is attached to the electrode terminals inside the outer packaging. The battery pressing device has a pressing member for pressing the battery cell in the layering direction of the battery element over a region within which the insulating member inside the external casing is not pressed.

The battery pressing method is a method for pressing a battery cell configured so that an electrolyte and a battery element in which electrodes and a separator are arranged in layers are included in an external casing. The battery cell has electrode terminals extending out of the external casing from an end of the battery element, and also has an insulating member that prevents short-circuiting of the electrode terminals and is attached to the electrode terminals inside the outer packaging. The battery pressing method comprises pressing the battery cell in the layering direction of the battery element over a region within which the insulating member inside the external casing is not pressed.

In the battery pressing device, a battery cell is pressed over a region within which the insulating member is not pressed, and thus air, gas, and the like inside the battery element can be removed and replaced with an electrolyte infused into the battery element. The section where the insulating member resides is not pressed, and short-circuiting of the electrode terminals due to deformation or failure of the insulating member can therefore be prevented, and damage to the surface of the external casing by the pressing member can be minimized.

In the battery pressing method, the battery cell is pressed over a region within which the insulating member is not pressed, and air, gas, and the like in the battery element can therefore be removed without pressing unnecessary sections, minimizing damage to the surface of the external casing by the pressing members. Because the section in which the insulating member resides is not pressed, short-circuiting of the battery terminals due to deformation or failure of the insulating member can be prevented.

BRIEF DESCRIPTION OF THE DRAWINGS

Referring now to the attached drawings which form a part of this original disclosure.

DETAILED DESCRIPTION OF THE EMBODIMENTS

Figure 1:
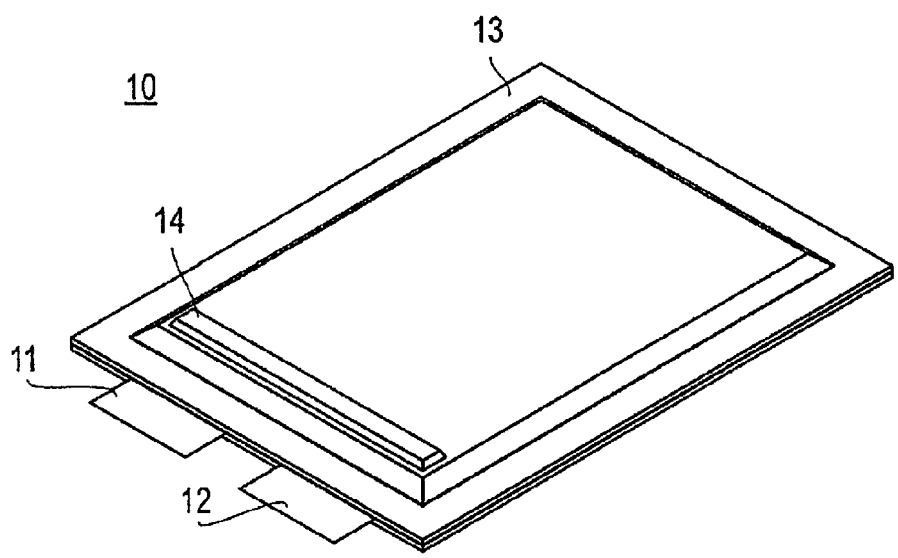
FIG. 1 is a perspective view showing the exterior of the battery cell.

Embodiments of the present invention are described below with reference to the accompanying drawings. In the descriptions of the drawings, the same symbols refer to the same elements, and duplicate descriptions are thus not made. The dimensional ratios in the drawings may be exaggerated in order to aid in description and thus may differ from the true ratios in some instances.

The present invention relates to a battery pressing device and a battery pressing method whereby gas and air that are included in a battery element are pressed out by pressing the surface of the battery cell. The structure of the battery that is to be pressed will be described prior to describing the battery pressing device and method.

(Battery)

Figures 2A, 2B:
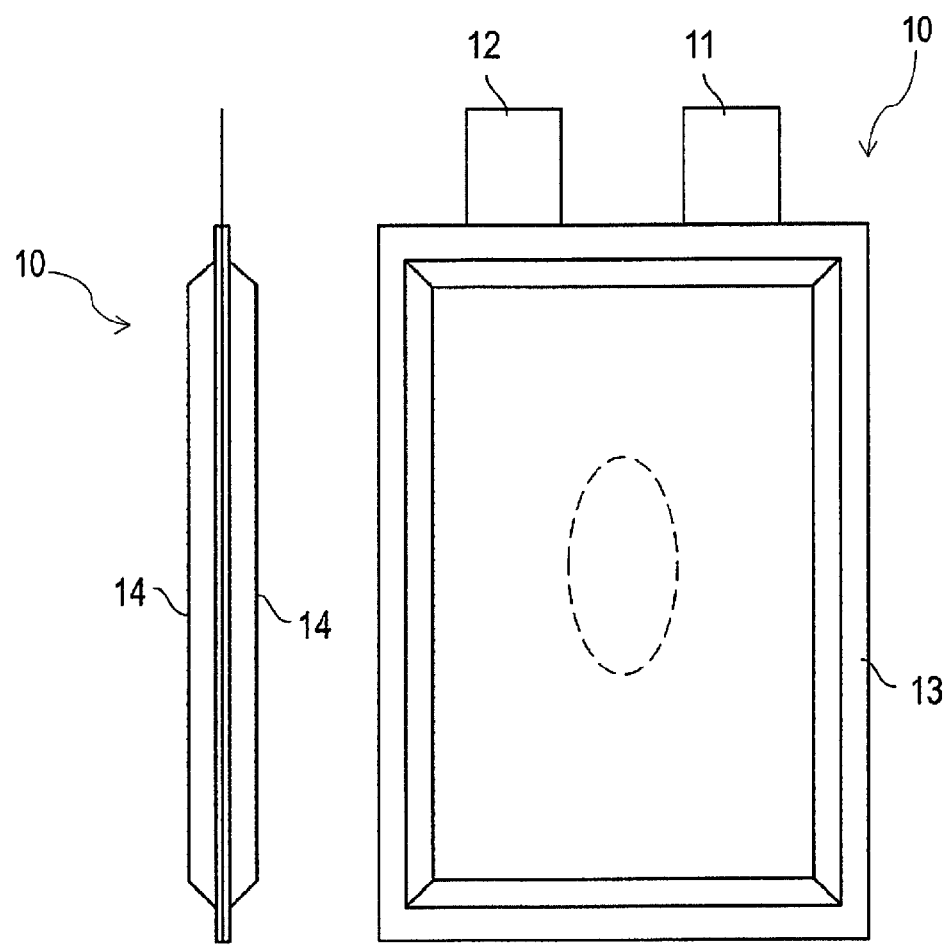
FIGS. 2A and 2B are diagrams showing a plan view and side view of the battery cell.
Figure 3:
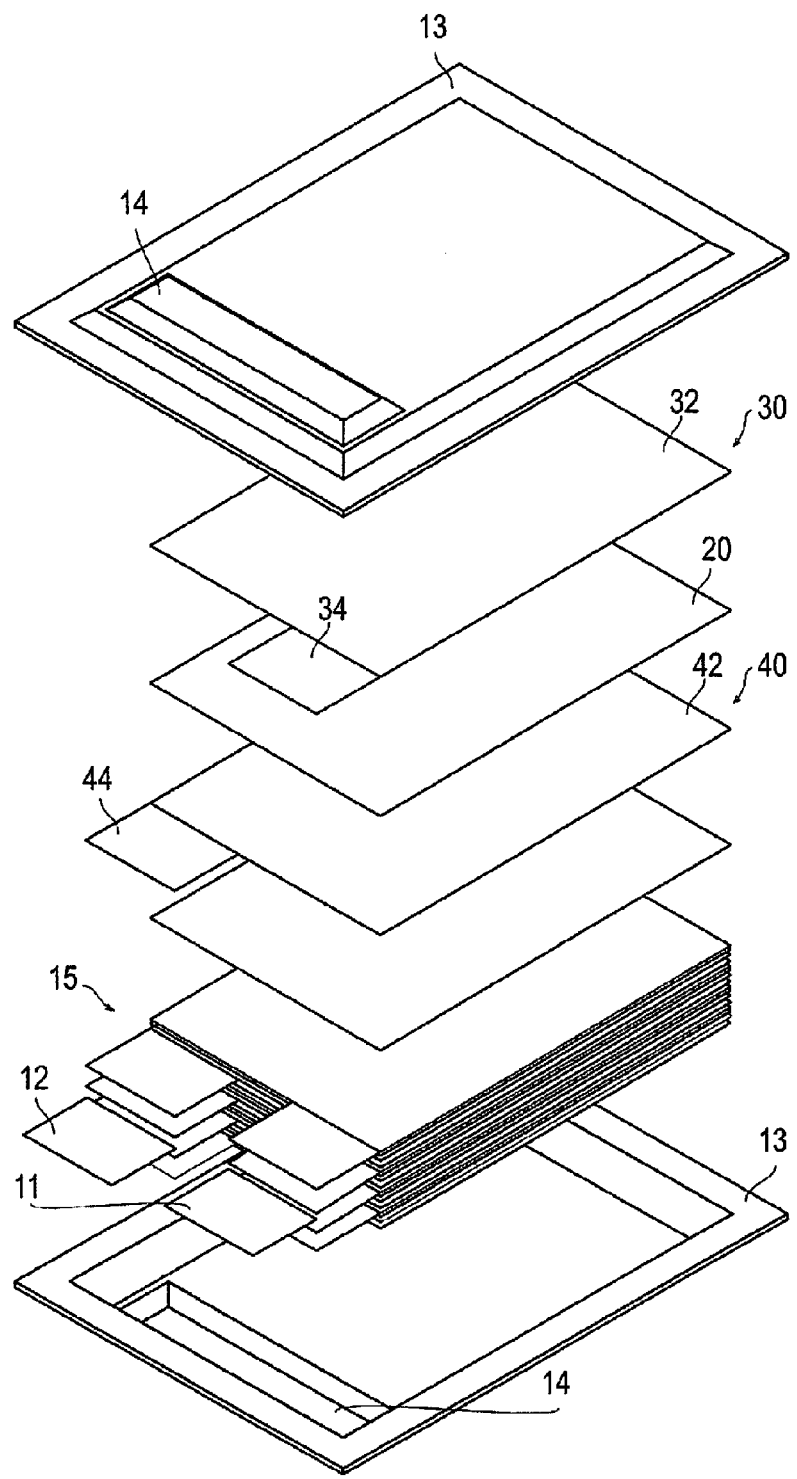
FIG. 3 is an exploded perspective view of the battery cell.
Figure 4:
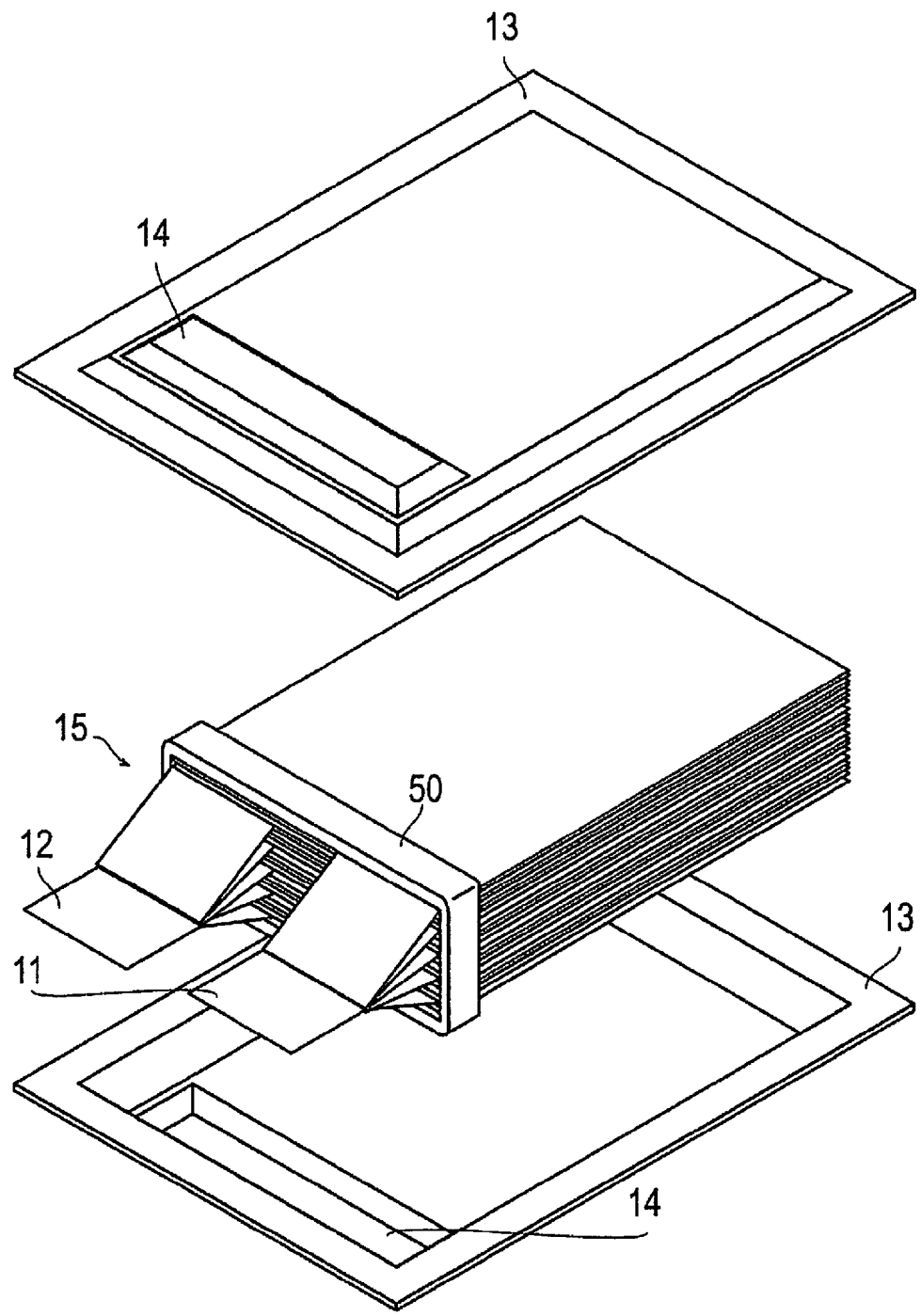
FIG. 4 is a perspective view showing the manner in which the insulating member is wound on the electricity-generating element.

FIG. 1 is a perspective view showing the exterior of a battery cell. FIGS. 2A and 2B are diagrams showing a plan view and side view of the battery cell. FIG. 3 is an exploded perspective view of the battery cell. FIG. 4 is a perspective view showing the manner in which the insulating member is wound on the electricity-generating element.

As shown in FIGS. 1 and 2, the battery cell 10 has a flattened rectangular shape, with a positive electrode lead 11 and a negative lead 12 exiting from the same end of an external casing 13. The external casing 13, for example, is produced by applying a resin coating to the surface of an aluminum sheet.

As shown in FIG. 3, the interior of the external casing 13 contains electrolyte and electricity-generating elements (battery elements) 15 in which the charging and discharging reactions occur. Each of the electricity-generating elements 15 is formed by alternately layering a positive electrode 30 and a negative electrode 40, with a sheet-form separator 20 interposed therebetween. In some cases, air, gas, or the like remains in the battery element 15 (separator 20) after the electricity-generating element 15 has been disposed in the external casing 13, or after the electrolyte has been added. For example, gas or air remains in the circular region indicated by the dotted line in FIG. 2B.

The positive electrode 30 has a positive electrode active material layer 32 formed on both surfaces of a sheet-form positive electrode collector. The positive electrode active material layer 32 is not formed on the tab portion 34 of the positive electrode 30. The respective tab portions 34 of the positive electrodes 30 are provided at overlapping positions as seen from the layering direction of the electricity-generating elements 15. Each of the tab portions 34 connect with a positive electrode lead 11. In order to ensure connections between the tab portions 34 and in order to prevent short-circuiting of the electrodes, as shown in FIG. 4, an insulating tape (insulating member) 50 is wound onto an end of each of the electricity-generating elements 15. As a result of winding of the insulating tape 50, when the electricity-generating element 15 is housed in the external casing 13, the external casing 13 is pressed onto the insulating tape 50 from the inside, deforming it and forming a protrusion 14.

With the negative electrode 40, a negative electrode active material layer 42 is formed on both surfaces of a sheet-form negative electrode collector. The negative active material layer 42 is not formed on the tab portions 44 of each of the negative electrodes 40. The respective tab portions 44 of the negative electrodes 40 are disposed at overlapping positions as seen from the direction of layering of the electricity-generating elements 15 and are disposed so as not to overlap with the tab portions 34 of the positive electrodes 30.

In order to ensure connections between the tab portion 44 of each of the negative electrodes 40 and the tab portion 34 of each of the positive electrodes 30, and in order to prevent short circuiting of the electrodes, as shown in FIG. 4, an insulating tape (insulating member) 50 is wound onto an end of each of the electricity-generating elements 15. As a result of winding of the insulating tape 50, when the electricity-generating element 15 is housed in the external casing 13, the external casing 13 is pressed onto the insulating tape 50 from the inside, producing a deformation and forming a protrusion 14.

The method itself is a typical method in which each of the electricity-generating elements 15 is formed by layering a separator 20, a positive electrode 30, and a negative electrode 40. A positive lead 11 and negative lead 12 are lead out, the electricity-generating element 15 is sealed in the external casing 13, and electrolyte is injected to manufacture the battery cell. Consequently, a detailed description of the method for manufacturing the battery cell 10 will not be given.

First Embodiment

A first embodiment of the battery pressing device for pressing the above-described battery cell 10 will now be described.

Figure 5:
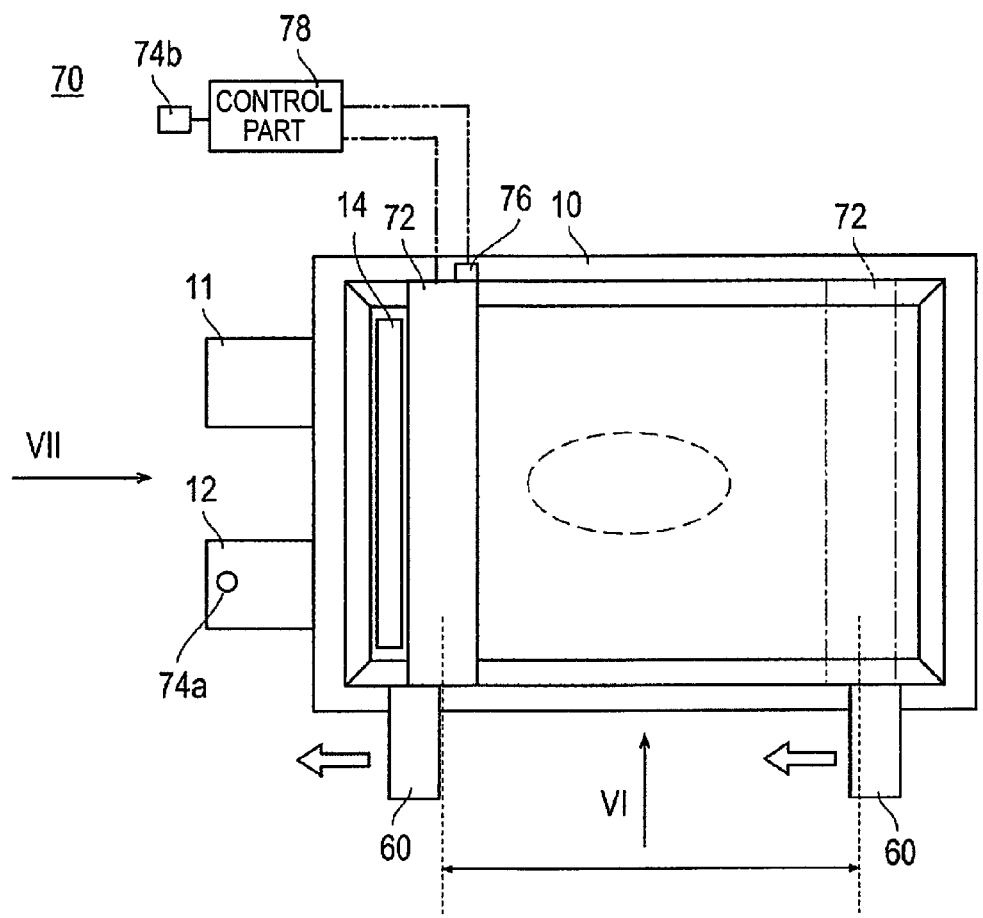
FIG. 5 is a schematic view showing the configuration of the battery pressing device.
Figure 6:
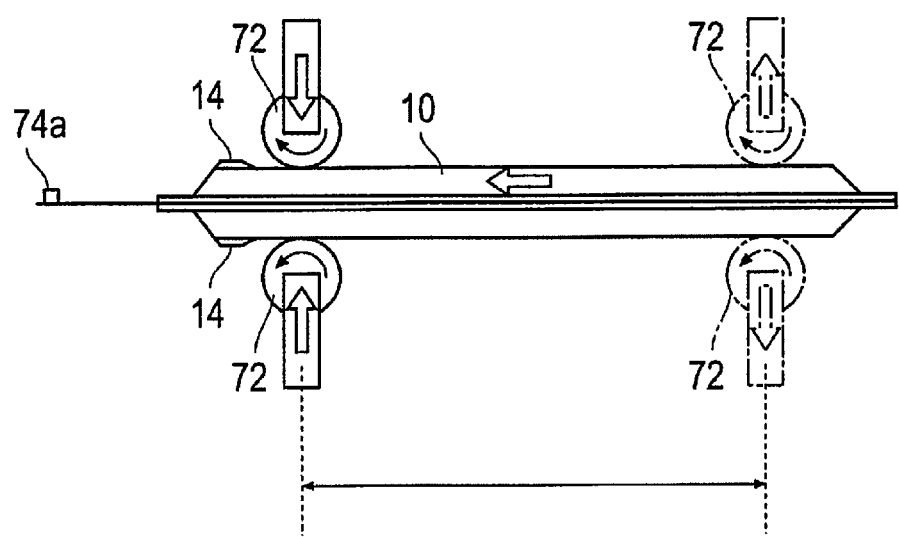
FIG. 6 is a schematic view seen from the direction of arrow VI in FIG. 5.
Figure 7:
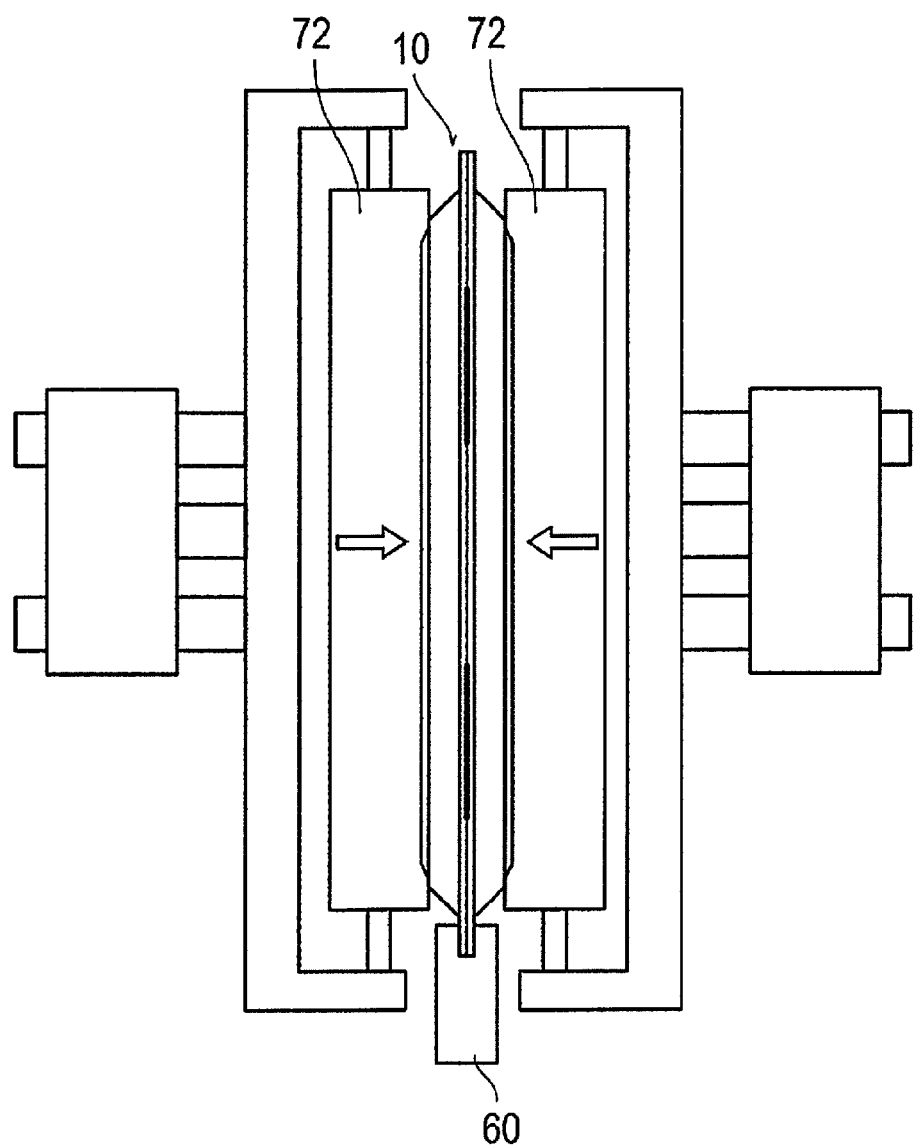
FIG. 7 is a schematic view as seen from the direction of arrow VII in FIG. 5.

FIG. 5 is a schematic diagram showing the configuration of the battery pressing device. FIG. 6 is a schematic diagram as seen from the direction of arrow VI in FIG. 5. FIG. 7 is a schematic diagram as seen from arrow VII in FIG. 5.

In this embodiment, the battery cell 10, as shown in FIGS. 5 and 7, is held at one edge of the external casing 13 by transport receivers 60. The transport receivers 60 move while sandwiching one edge of the external casing 13, thereby transporting the battery cell 10.

The battery pressing device 70 of the first embodiment has at least a pair of rollers 72, a position sensor 74, a rotation sensor 76, and a control part 78.

The pair of rollers 72 move relative to each other toward the battery cell 10 or away from the battery cell 10, with the battery cell 10 located between them. When the rollers 72 move towards each other and sandwich the battery cell 10, they function as a pressing member, and the battery element 15 inside the battery cell 10 can be pressed from both sides in the direction of layering via the external casing 13. The rollers 72 in the pair are drive rollers for performing rotational driving in a synchronous manner when pressing the battery cell 10. The rotation speed of the rollers 72 is preferably synchronized with the transport speed at which the transport receivers 60 transport the battery cell 10.

The position sensor 74, for example, is a photoelectric sensor that is attached to the battery cell 10 and comprises a transmitter 74a for sending a signal, and a receiver 74b for receiving the signal. The transmitter 74a is attached, for example, to the negative electrode lead 12 of the battery cell 10. The receiver 74b is connected to the control part 78 and receives the signal from the transmitter 74a along with transport of the battery cell 10. The position sensor 74 is used in order to monitor whether the battery cell 10 has reached the position appropriate for pressing by the rollers 72. The position appropriate for pressing is a position at which the rollers 72 can contact the battery cell 10 without pressing the insulating tape 50 in the battery cell 10, that is, without pressing the protrusion 14 on the external casing 13. When the battery cell 10 has advanced in relative terms in the direction indicated by the white arrow in FIG. 5, the position sensor 74 monitors whether battery cell 10 has been transported to a position at which a location immediately after the trailing side of the protrusion 14 (right side in the drawing) is sandwiched by the rollers 72.

The rotation sensor 76 is attached to the rollers 72 and can measure the number of rotations of the rollers 72. The results of measurement are transmitted to the control part 78. The rotation sensor 76, for example, is an encoder. However, the rotation sensor 76 may have any configuration, provided that it is a device that can measure rotation.

The control part 78 is connected to the rollers 72, the position sensor 74, and the rotation sensor 76, and controls the rollers 72 on the basis of the results of detection of the sensors 74, 76.

The operation of the battery pressing device 70 will now be described.

The control part 78 monitors the position of the battery cell 10 using the position sensor 74. When the battery cell 10 is transported to the position at which the battery element 15 can be pressed without pressing the insulating tape 50 in the battery cell 10 by the rollers 72, the control part causes the rollers 72 to move toward each other. As indicated by the solid lines in FIGS. 5 to 7, both surfaces of the battery cell 10 are pressed by the rollers 72.

The control part 78 drives the rollers 72 to rotate and brings about synchronization of the rotation speed of the rollers 72 and the speed at which the battery cell 10 is transported by the transport receivers 60. As a result, the speed of the battery cell 10 and the speed of the rotating surfaces of the rollers 72 match each other, and there is no friction on the surfaces of the battery cell 10 in the direction of advancement. Pressing force is thus applied to the battery cell 10 from the roller 72 only in the vertical direction (layering direction of the battery element 15).

During the time that the battery cell 10 advances and the rollers 72 rotate, the control part 78 measures the number of rotations of the rollers 72 using the rotation sensor 76. The control part 78 will cause the rollers 72 to move away from the battery cell 10 when the number of rotations of the rollers 72 reaches a predetermined threshold (number of rotations). This predetermined threshold is the number of rotations sufficient for the rollers 72 to press the battery element 15 inside the battery cell 10. The number of rotations is set so that the surface of the battery cell 10 can be pressed as the rollers 72 pass over at least the region in which gas or air is retained inside the battery cell 10. For example, in FIGS. 5 and 6, pressure is applied by the rollers 72 up until the rollers 72 indicated by solid lines reach the position indicated by the broken lines relative to the battery cell 10. In the drawings, the region represented by the two arrows is pressed.

As stated above, with the battery pressing device of the first embodiment, the battery cell 10 is pressed over a region within which the insulating tape is not pressed. Consequently, the gas, air, and the like in the electricity-generating element 15 can be pressed out from the battery element 15 without pressing unnecessary portions, and can be replaced with an electrolyte infused into the battery element 15. Because the insulating tape 50 is not pressed by the rollers 72, short-circuiting of the electrode leads or the electrodes due to deformation or failure of the insulating tape 50 can be prevented, and damage to the surface of the external casing 13 by the rollers 72 can be minimized.

In addition, because the battery cell 10 is pressed from both sides by uniform linear contact with the rollers 72, layer shifting does is not caused in the battery element 15 by pressing with the rollers 72. Furthermore, because the battery cell 10 can be pressed uniformly from both sides, the battery cell 10 is not warped in one direction after pressing.

Because the pair of rollers 72 perform driving during pressing of the battery cell 10, the battery cell 10 can be transported at the same time as the battery cell 10 is pressed. The battery cell 10 can be pressed by the rollers 72 at the transport rate at which the battery cell 10 has been transported prior to pressing. As a result, it is not necessary to stop or slow down the battery cell 10 during pressing, and the production cycle can be improved relative to cases in which the battery cell 10 is stopped or slowed down.

In addition, because the two rollers of the pair of rollers 72 are synchronized with each other, force is applied from the rollers 72 only in a vertical direction and is not applied in the horizontal direction in the battery cell 10. This prevents the layers in the battery element 15 from being shifted by pressing.

Because the position of initiation of pressing of the battery cell 10 is monitored by the position sensor 74, the initiation of pressing can be precisely set. In addition, even after initiation of pressing, the stroke of the pressing by the rollers 72 can be maintained constant through control of the number of rotations by the rotation sensor 76.

In the above embodiment, a case was described in which the rollers 72 of the pair were drive rollers. However, both may be driven rollers that do not perform rotational driving, or one of them may be a drive roller. When the rollers 72 are both driven rollers, the rollers 72 rotate in accordance with the battery cell 10 that moves by the transport receivers 60.

In addition, in the above embodiment, the position of the rollers 72 was fixed, and the battery cell 10 was moved by the transport receivers 60. However, the battery cell 10 may be stationary and the rollers 72 may move, or both the battery cell 10 and the rollers 72 may move in opposite directions. In relative terms, the rollers 72 should move from the position indicated by the solid lines to the position indicated by the broken lines in FIG. 5.

Second Embodiment

In the first embodiment, an example was described in which an edge of the battery cell 10 was held by the transport receivers 60, and the battery cell 10 was transported in a standing state. In the second embodiment, an example is described in which the battery cell 10 is transported by being carried on a transport tray, and is pressed by the rollers.

Figure 8:
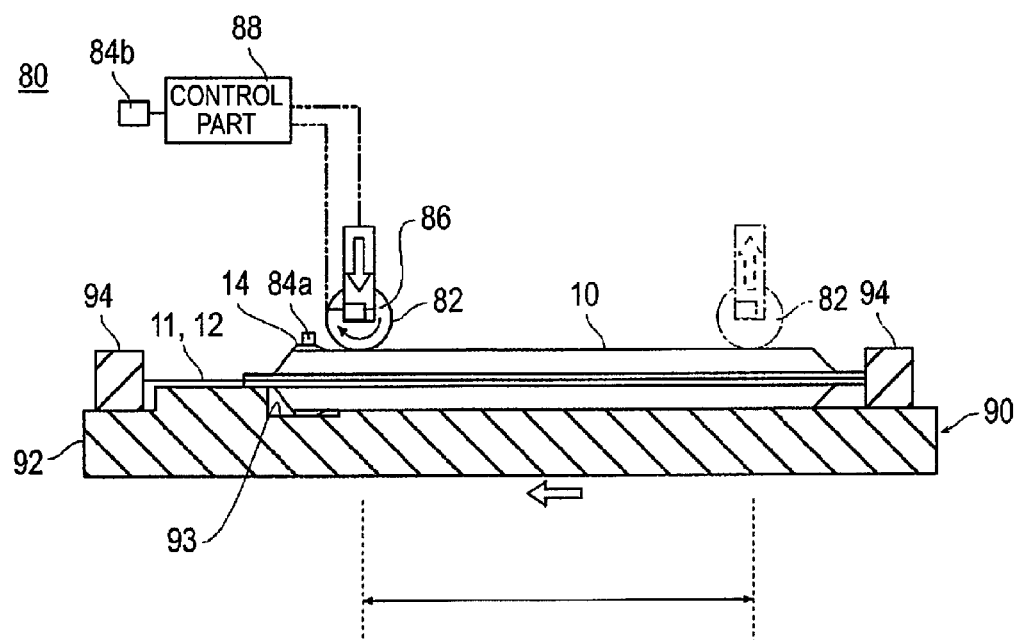
FIG. 8 is a schematic side view showing the manner in which the battery cell is placed on the transport tray.
Figure 9:
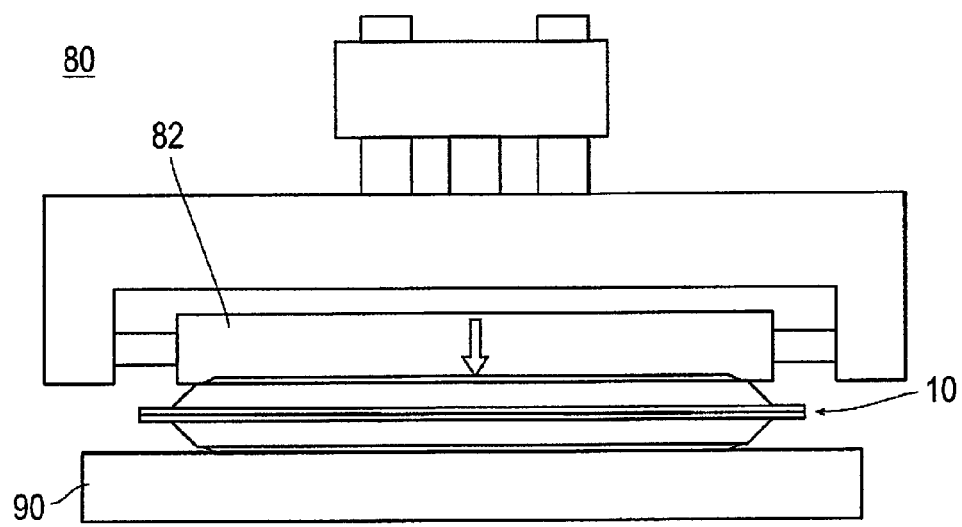
FIG. 9 is a schematic view as seen from the direction of arrow IX in FIG. 8.

FIG. 8 is a schematic side view showing the manner in which the battery cell is placed on the transport tray. FIG. 9 is a schematic diagram as seen from the direction of arrow IX in FIG. 8. In FIG. 9, the fixed guide is not shown.

The battery pressing device 80 in the second embodiment has a roller 82, a position sensor 84, a rotation sensor 86, a control part 88, and a transport tray 90.

The roller 82 has the same function as the pair of rollers 72 in the first embodiment. Specifically, the roller can move toward or away from the battery cell 10 and press the battery cell 10 while rotating.

The position sensor 84 and the rotation sensor 86 also have the same configurations as the position sensor 74 and the rotation sensor 76 in the first embodiment. For example, the transmitter 84a of the position sensor 84 is attached near the protrusion 14 of the battery cell 10, and the receiver 84b that receives the signal from the transmitter 84a is connected to the control part 88. The transmitter 84a, as in the first embodiment, may be attached to the electrode leads 11, 12.

The control part 88 is connected to the roller 82, the position sensor 84, and the rotation sensor 86 and is in control of each configuration.

The transport tray 90 has a seat part 92 and a fixed guide 94. The seat part 92 holds the mounted battery cell 10. A depression 93 is formed in the seat part 92. The depression 93 is formed so as to have a size and position corresponding to the protrusion 14 of the external casing 13 when the battery cell 10 is placed in the seat part 92. As shown in FIG. 8, the protrusion 14 of the battery cell 10 is retained in the depression 93, and the entire battery cell 10 is directed by the seat part 92. The protrusion 14 protrudes out into the depression 93, and thus the battery cell 10 is transported while oriented horizontally.

The fixed guide 94 is disposed on the seat part 92 and abuts the edge of the external casing 13 or the electrode leads 11, 12 of the battery cell 10, thereby preventing shifting of the battery cell 10.

The operation of the battery pressing device 80 is described below.

The control part 88 monitors the position of the battery cell 10 using the position sensor 84. When the battery cell 10 has been transported to a position at which the battery element 15 can be pressed by the roller 82 without pressing the insulating tape 50 in the battery cell 10, the control part causes the roller 82 to move toward the battery cell. As indicated by the solid lines in FIGS. 8 and 9, one surface of the battery cell 10 is pressed by the roller 82.

The control part 88 drives the roller 82 to rotate, synchronizing the rotation speed of the roller 82 with the speed at which the transport tray 90 advances the battery cell 10. As a result, the speed of the rotating surface of the roller 82 matches the speed of the battery cell 10, and there is no friction on the surface of the battery cell 10 in the direction of advancement. The pressing force from the roller 82 acts on the battery cell 10 only in the vertical direction (layering direction of the battery element 15).

The control part 88 measures the number of rotations of the roller 82 using the rotation sensor 86 during the time when the battery cell 10 advances and the roller 82 rotates. The control part 88 moves the roller 82 away from the battery cell 10 when the number of rotations of the roller 82 reaches a predetermined threshold (number of rotations). For example, in FIG. 8, pressure from the roller 82 is applied until the roller 82 indicated by the solid line reaches the position indicated by the broken lines relative to the battery cell 10. In the drawing, the region indicated by the two arrows is the pressing region.

As described above, in the second embodiment as well, the battery cell 10 is pressed over a region in which the insulating tape 50 in the battery cell 10 is not pressed. Consequently, as with the first embodiment, air, gas, and the like in the battery element 15 can be pressed out from the battery element 15 without pressing unnecessary sections, and can be replaced with an electrolyte infused into the battery element 15. The insulating tape 50 is not pressed by the roller 82, and short-circuiting of the electrode leads or the electrodes due to deformation or failure of the insulating tape 50 can therefore be prevented, and damage to the surface of the external casing 13 by the roller 82 can be minimized.

In addition, in the second embodiment, the battery cell 10 is carried on the transport tray 90. Therefore, air, gas, and the like are removed from the battery element 15 by sandwiching the battery cell 10 by the transport tray 90 and the roller 82.

In addition, because the depression 93 is formed in the transport tray 90, the battery cell 10 can be positioned horizontally. If there were no depression 93, then the battery cell 10 as a whole would tilt due to the protrusion 14 of the battery cell 10. If pressing were carried out by the roller 82 in this state, then the battery element 15 would not be pressed vertically, and layer shifting might arise in the battery element 15. In addition, the battery cell 10 could warp or deform in some cases. However, in this embodiment, because the protrusion 14 of the battery cell 10 is accommodated by the depression 93 of the transport tray 90, the battery cell 10 will be disposed horizontally with respect to the transport tray 90. As a result, the battery element 15 can be pressed vertically by the pressing member 82, and layer shifting will not arise in the battery element 15. Warping or deformation of the battery cell 10 also will not occur because biased force will not be applied by the pressing member 82 to the battery cell 10 due to the protrusion 14.

Third Embodiment

Rollers were used as the pressing members in the first and second embodiments, but an elastic body is used instead of a roller in the third embodiment.

Figure 10:
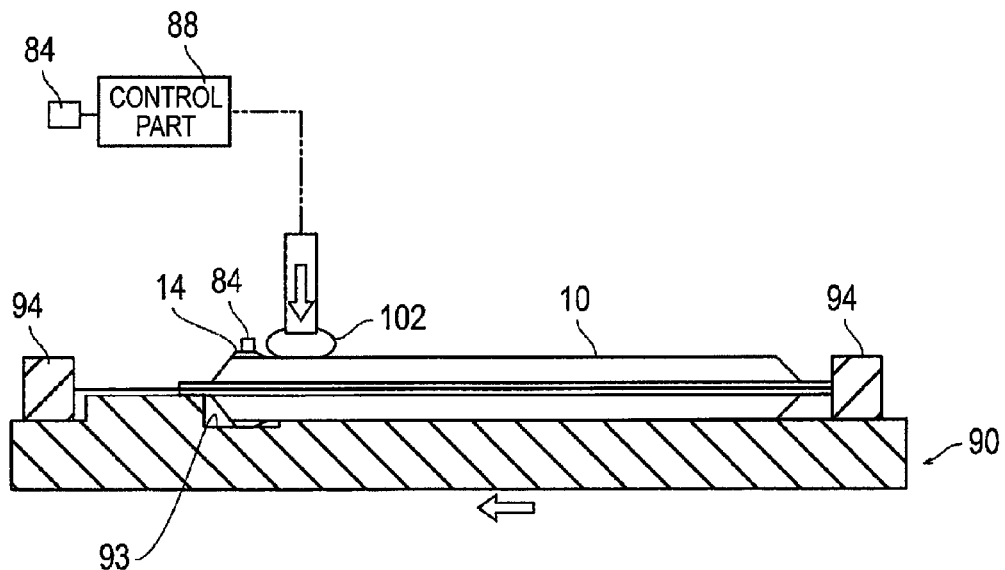
FIG. 10 is a diagram showing the mode for using an elastic body as the pressing member.

FIG. 10 is a diagram showing the condition in which the elastic body is used as the pressing member.

The configuration shown in FIG. 10 is roughly the same as in the second embodiment. The difference is that an elastic body 102 is provided instead of the roller 82. The same reference symbols are used for the same configurational elements as in the second embodiment.

The elastic body 102 has a pressing surface constituted by an elastic body that has a deformable shape. The elastic body 102 is connected to the control part 88. Based on the results of detection by the position sensor 84, the control part 88 sets the timing for pressing of the battery element 15 with the elastic body 102 without pressing the insulating tape 50. Because the elastic body 102 does not rotate, the control part 88 measures the pressing time of the elastic body 102, rather than detecting the rotation rate using a rotation sensor 86. When the predetermined pressing time has been reached, the elastic body 102 is moved away from the battery cell 10.

In the third embodiment, an elastic body 102 is used as the pressing member. Therefore, the battery element 15 can be pressed reliably via the external casing 13, irrespective of the surface shape of the battery cell 10.

The elastic body 102 in the third embodiment can be used when pressing the battery cell 10 from both sides, as in the first embodiment.

Fourth Embodiment

In the fourth embodiment, a configuration is described in which a cleaning cell (dummy cell) is used for cleaning the roller or elastic body of the battery pressing device.

Figure 11:
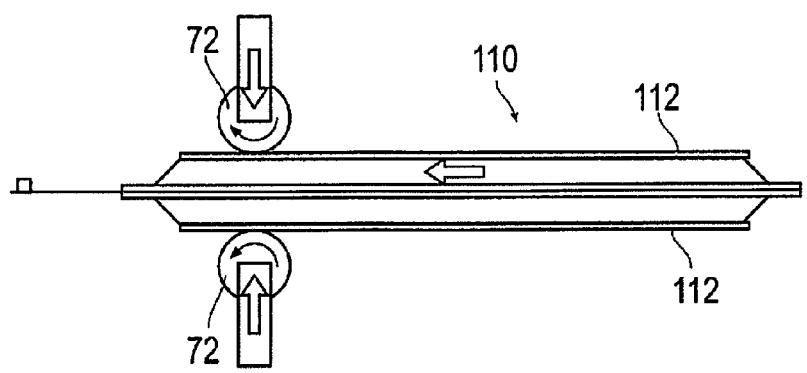
FIG. 11 is a diagram showing the manner in which a cleaning cell is pressed by the battery pressing device.

FIG. 11 is a diagram showing the manner in which a cleaning cell is pressed by the battery pressing device.

The cleaning cell 110 has a shape that is roughly similar to the battery cell of the first through third embodiments. However, the cleaning cell 110 has an adhesive layer 112 on the surface thereof. The adhesive layer 112 has adhesive properties to capture foreign matter such as dirt and dust.

The battery cleaning device presses the cleaning cell 110 instead of the battery cell 10. The pressing operation at this time is the same as in the first through third embodiments. In FIG. 11, an example is shown in which the cleaning cell 110 is used for the battery pressing device 70 of the first embodiment. The cleaning cell 110 is held by the transport receivers 60 and is transported in the same manner as the battery cell 10.

The control part 78 confirms the position of the cleaning cell 110 using the position sensor 74 attached to the cleaning cell 110, and initiates pressing of the cleaning cell 110. The control part 78 continues pressing the cleaning cell 110 until the number of rotations detected by the rotation sensor 76 reaches a predetermined number of rotations. As a result of pressing of the cleaning cell 110 with the roller 82, that is, as a result of contact of the roller 72 with the adhesive layer 112, foreign matter that has adhered to the surface of the roller 72 is captured and transferred to the adhesive layer 112, thereby cleaning the surface of the roller 72.

As a result, the cleaned roller 72 subsequently can be used for actual pressing of a battery cell 10. Consequently, it is possible to prevent foreign matter on the surface of the roller 72 from damaging the surface of the battery cell 10 when the roller 72 is pressed onto the battery cell 10.

The invention claimed is:

1. A battery pressing method for pressing a battery cell, the battery cell including an external casing, an electrolyte, and a battery element in which electrodes and a separator are arranged in layers in the external casing, electrode terminals extending out of the external casing from an end of the battery element, and an insulating member for preventing short-circuiting of the electrode terminals attached to the electrode terminals inside the external casing, the method comprising:

pressing the battery cell in a layering direction of the battery element with an automatically controlled pressing member over a region so as to avoid pressing the insulating member inside the external casing.

2. The battery pressing method according to claim 1, wherein
the pressing member is a pair of rollers, the pair of rollers sandwiching the battery cell therebetween, and pressing the battery element from both sides in the layering direction.

3. The battery pressing method according to claim 1, wherein
the pressing member is a roller, and the pressing includes pressing a surface of the battery cell while rotating the roller, and
while pressing the roller onto the battery cell, carrying the battery cell on a transport tray.

* * * * *